July 16, 1935.  R. L. HALLOCK  2,008,303
REFRIGERATOR AND FOOD STORAGE DEVICE PARTICULARLY THEREFOR
Filed Oct. 24, 1934   3 Sheets-Sheet 2
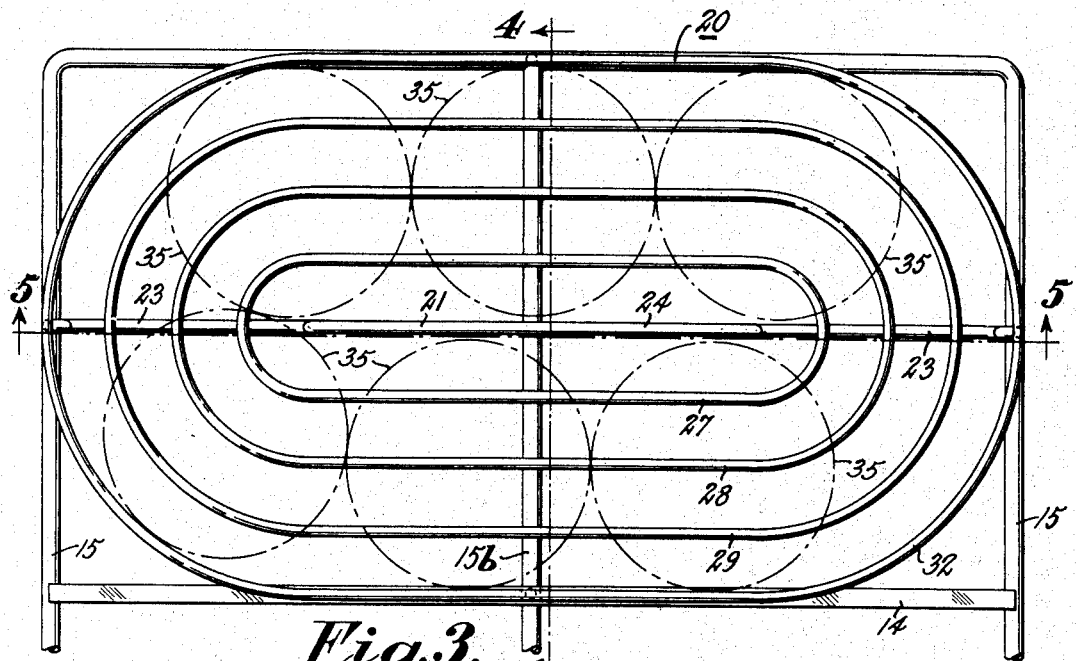
Fig. 3.
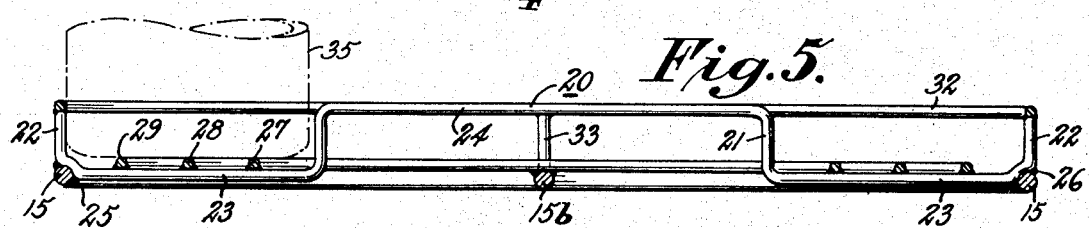
Fig. 5.
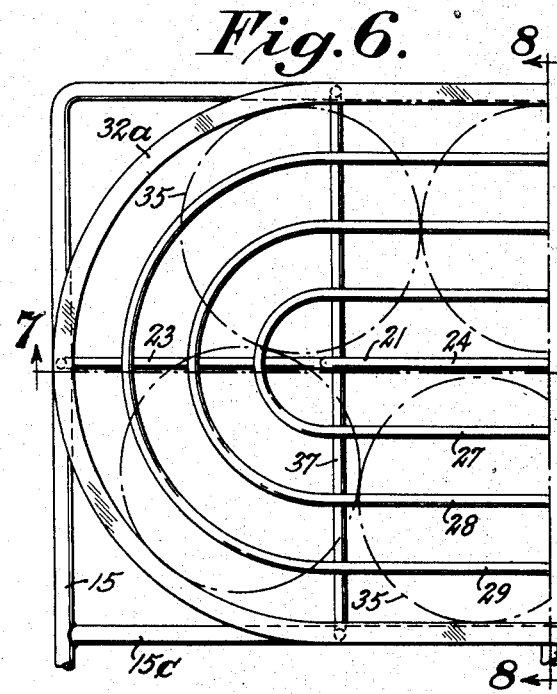
Fig. 6.
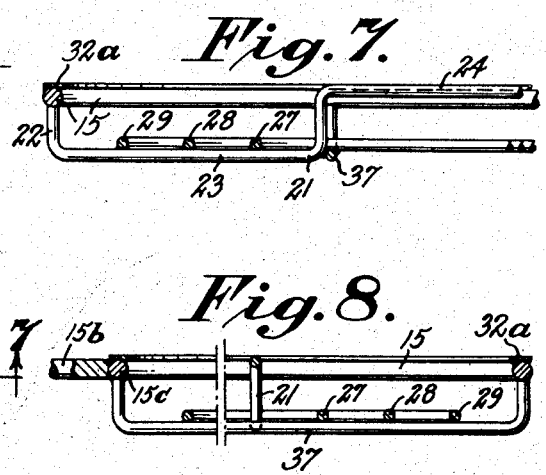
Fig. 7.
Fig. 8.
INVENTOR,
Robert Loy Hallock
BY
ATTORNEY.

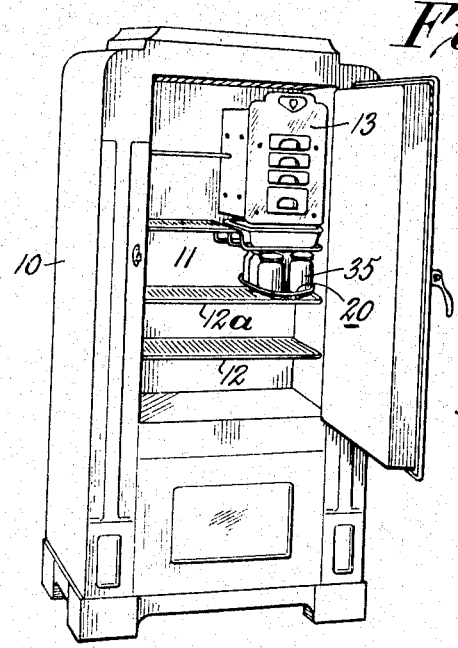
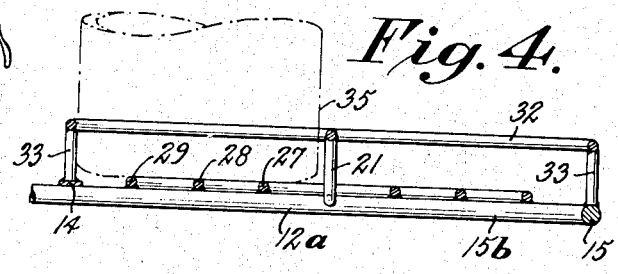
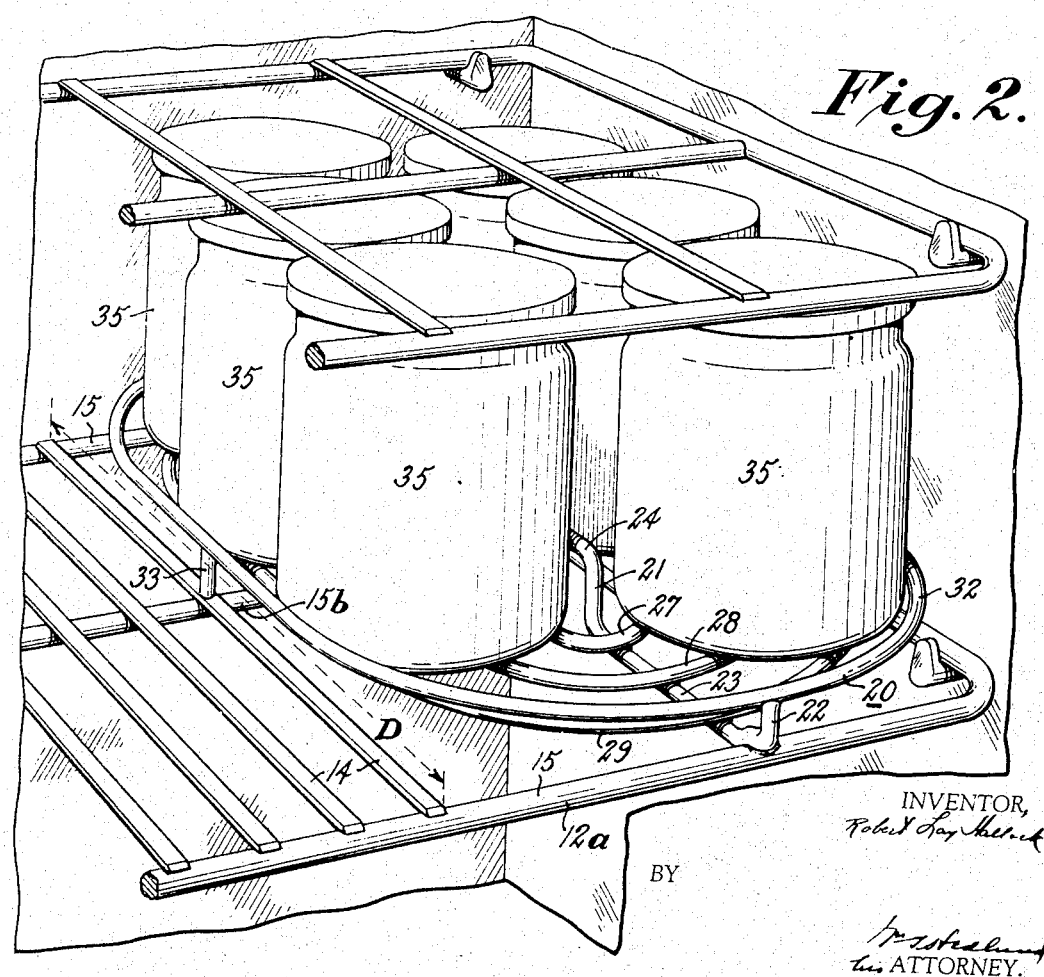

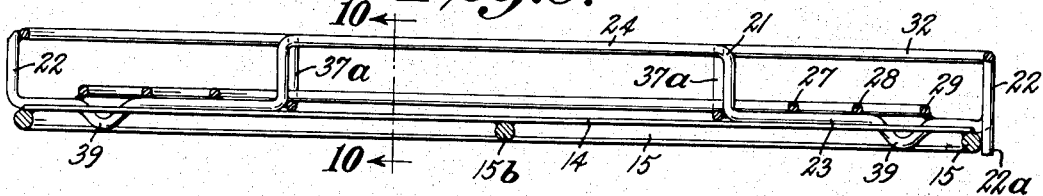
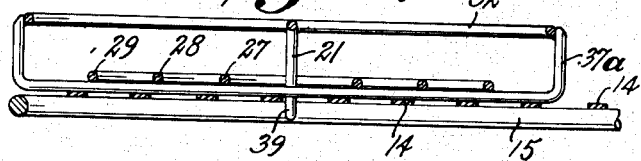
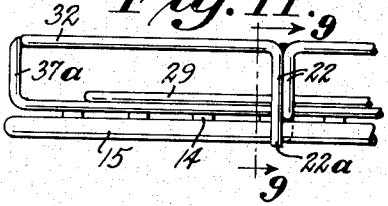
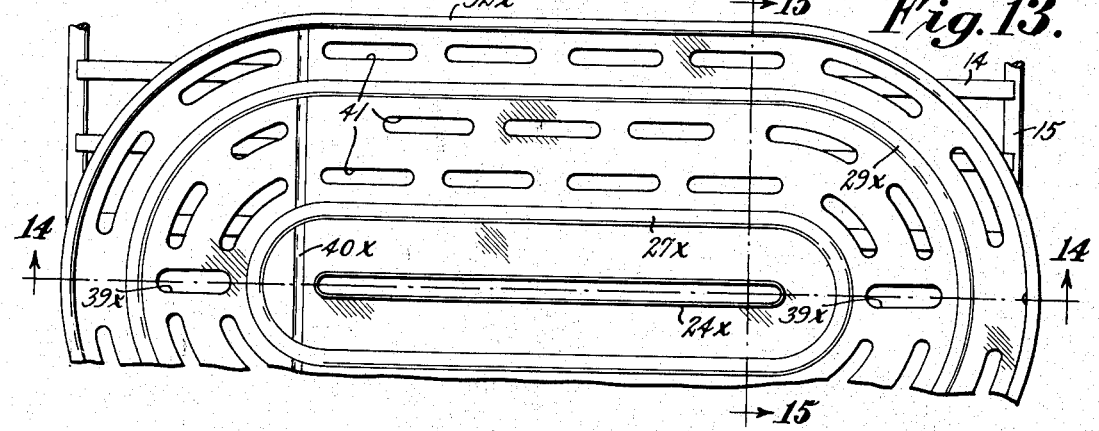
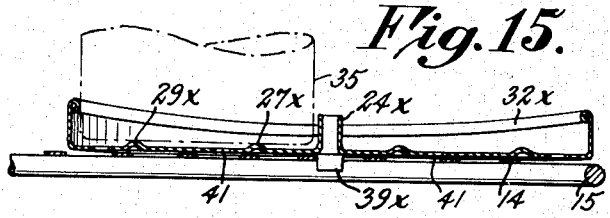

Patented July 16, 1935

2,008,303

UNITED STATES PATENT OFFICE 2,008,303

REFRIGERATOR AND FOOD STORAGE DEVICE PARTICULARLY THEREFOR

Robert Lay Hallock, Larchmont, N. Y.

Application October 24, 1934, Serial No. 749,726

18 Claims. (Cl. 62—89)

My invention relates primarily to refrigerators and food storage devices therefor. A problem with refrigerators is the efficient utilization of food space. Usually refrigerators are appreciably deep, that is in horizontal extent back to the rear vertical food space wall. If dishes or containers are placed one in front of another, the rear containers are inaccessible. It has been proposed to make a circular refrigerator with revolving shelves to gain access to food stored at the back. Such refrigerators are costly to build and not practical. It has been proposed to have a rotatable table on which jars are set. These devices leave unusable space behind them and are inefficient from space utilization point of view. A round device does not efficiently utilize a rectangular space. Besides, to run easily they require roller mountings.

The principal object of my invention is to provide a device for storing food in a refrigerator which requires little space, efficiently utilizes space, extends for the depth of or depthwise of the refrigerator, is not complicated mechanically, is easy to use, can be readily cleaned, provides adequate air circulation, and is inexpensive.

Various forms of my invention are shown on the accompanying drawings which form a part of the specification and of which:

Fig. 1 is a perspective view of a refrigerator embodying the invention;

Fig. 2 is a perspective view at close range of a device in accordance with the invention;

Fig. 3 is a plan view of the device of Fig. 2;

Fig. 4 is a sectional view taken on the line 4—4 of Fig. 3;

Fig. 5 is a sectional view taken on the line 5—5 of Fig. 3;

Fig. 6 is a plan view of another embodiment of the invention;

Fig. 7 is a sectional view taken on the line 7—7 of Fig. 6;

Fig. 8 is a sectional view taken on the line 8—8 of Fig. 6;

Fig. 9 is a vertical sectional view of still another embodiment of the invention and is taken on the line 9—9 of Fig. 11;

Fig. 10 is a sectional view taken on the line 10—10 of Fig. 9;

Fig. 11 is an end view of the device shown in Figs. 9 and 10;

Fig. 12 is a sectional view of still another embodiment of the invention;

Fig. 13 is a plan view of a device in accordance with the invention distinguished by being made of sheet metal;

Fig. 14 is a sectional view taken on the line 14—14 of Fig. 13; and

Fig. 15 is a sectional view taken on the line 15—15 of Fig. 13.

Referring to Figs. 1 to 5, a refrigerator cabinet 10 has a food space 11 in which is positioned a plurality of horizontal shelves 12. The refrigerator may be cooled by an evaporator 13 or by any other means such as ice.

One of the shelves 12a has the usual ribbon strips 14 or other supporting members mounted on the frame member 15 for part of the width of the shelf. In place of the ribbon members 14 at one side of the shelf (it may however be in any part of the shelf) I provide a track designated generally by numeral 20. Track 20 may, as shown, be made of metal wires fastened together as by spot-welding and fastened to the frame 15. These wires include a central longitudinal member 21 having vertical parts 22 at the ends, lower supporting parts 23 and a central raised part 24 forming a central rail. The wire 21 is welded to the frame member 15 at 25 and 26. A plurality of wires 27, 28 and 29 are mounted on parts 23 and welded thereto. Wires 27, 28 and 29 are laterally supported on and secured to a central frame bar 15b. Wires 27, 28 and 29 are preferably continuous or substantially endless and in a horizontal or substantially horizontal plane and constitute the floor of the substantially endless track. The outside of the track is formed by a wire rail 32 raised from the plane of the wires 27, 28, 29 and mounted on the vertical parts or posts 22 and on lateral vertical posts 33 mounted on central frame bar 15b. Parts 27, 28, 29 and 32 have straight wire portions parallel to and coextensive with part 24. The ends are curved as shown so that the track 20 extends the full depth D of the refrigerator and yet is materially narrower than its length.

The track supports a plurality of bottles or containers 35 preferably cylindrical in shape and having suitable covers. They may be made of glass or any other substance. The bottles 35 should be of such height that they can be slipped under the next higher shelf onto the track. Each bottle has a diameter somewhat less than the distance between inner and outer rails 24 and 32. In the embodiment shown, six bottles are used, wherefore it will be seen that the width of the track is not materially greater than twice the diameter of a bottle whereas the length of the track is more than three times the diameter of a bottle.

The device is operated by pushing on the bottle at the front end of one of the track sections. The bottles contact and the push on the one bottle causes the other to move around the track. By moving the nearest approaching bottle next to the one previously pushed and repeating this any desired bottle can be brought to the front. The bottles contact each other in movement like rollers. To most efficiently utilize the track the open space between bottles at the front should be less than would receive one bottle and preferably one sufficient to permit the manipulation. The bottles need no guiding at the top. Various foods may be placed in the different containers and are readily accessible. It will be seen that the device does not hinder air circulation.

In the embodiment shown in Figs. 6, 7 and 8, the track is lowered so that the rails are substantially in the plane of the shelf. The outer rail 32a is formed by a thin strip of metal spot-welded to frame 15 and a longitudinal frame member 15c. The end parts 22 of central member 21 are secured to frame 15. A transverse member 37 passes under and assists in supporting the bottom wires or ridge members 27, 28 and 29. The operation of this device is the same as that previously described.

Figs. 9, 10 and 11 show a track loosely mounted on a shelf. The track is somewhat like that shown in Figs. 3, 4 and 5 but is not attached to the frame 15. Transverse members 37a are provided to assist in supporting members 27, 28 and 29. Part 21 has downward bends 39 which fit between ribbons 14 to prevent substantial lateral movement and the front vertical part 22 is formed with a downward projection 22a to engage the front part of frame 15 to prevent the track being pushed rearwardly.

In the embodiment shown in Fig. 12, the rails 32c and 24c are inclined appreciably so as to be relatively high at the rear of the food space and low at the front. Any tendency for the bottles to leave the track is greatest at the rear and the high rail offsets any such tendency. At the front, the rail need not be high and is advantageously very low to permit easy insertion and removal of bottles. In this embodiment, I also provide a piece 40 which raises the rear part of the track relative to the front. I have found that the bottles slide easier if the track tilts down a little toward the front.

Figs. 13, 14 and 15 show a track made of sheet metal. It may be stamped from a single sheet. Suitable indentations in and forming of the metal supply parts correspond to those of the previous embodiment as indicated by similar reference characters. Suitable air circulation openings 41 are provided. Instead of being made of metal the track may be made of other material such as bakelite or celluloid.

It will be obvious that many changes may be made within the spirit and scope of the invention.

What I claim is:

1. In a refrigerator, walls defining a food space having a given depth, a horizontal shelf in said food space, a substantially endless track associated with said shelf having lateral rail parts and bottom contact surface of small area, and a plurality of cylindrical containers on said track, the length of the track being substantially equal to the depth of the refrigerator, the width of the track being not materially greater than twice the diameter of a container, the track being disposed depthwise of the refrigerator, said rail parts being a relatively small distance above the bottom contact surface and constituting the only retaining means for the containers, whereby a container may be pushed at the front of the refrigerator to cause all the containers to travel in the track, guided by the rail parts, the containers on one side of the track moving rearwardly and on the other forwardly, the containers acting as rollers with respect to each other.

2. In a refrigerator, walls defining a food space having a given depth, a horizontal shelf in said food space, a substantially endless track associated with said shelf having outer and inner lateral rail parts and bottom contact surface of small area, and a plurality of cylindrical containers on said track, the length of the track being substantially equal to the depth of the refrigerator, the width of the track being not materially greater than twice the diameter of a container, the track being disposed depthwise of the refrigerator, said rail parts being a relatively small distance above the bottom contact surface and constituting the only retaining means for the containers, the outer rail part being higher at the rear end of the track than at the front end, whereby a container may be pushed at the front of the refrigerator to cause all the containers to travel in the track, guided by the rail parts, the containers on one side of the track moving rearwardly and on the other forwardly, the containers acting as rollers with respect to each other.

3. In a refrigerator, walls defining a food space having a given depth, a horizontal shelf in said food space, a substantially endless track associated with said shelf made essentially of round wires and having lateral rail wires and bottom wires providing contact surface of small area, and a plurality of cylindrical containers on said track, the length of the track being substantially equal to the depth of the refrigerator, the width of the track being not materially greater than twice the diameter of a container, the track being disposed depthwise of the refrigerator, said rail parts being a relatively small distance above the bottom contact surface and constituting the only retaining means for the containers, whereby a container may be pushed at the front of the refrigerator to cause all the containers to travel in the track, guided by the rail parts, the containers on one side of the track moving rearwardly and on the other forwardly, the containers acting as rollers with respect to each other.

4. In a refrigerator, walls defining a food space having a given depth, a horizontal shelf in said food space, a substantially endless track associated with said shelf made essentially of sheet metal and having lateral rail parts and bottom contact surface of small area, and a plurality of cylindrical containers on said track, the length of the track being substantially equal to the depth of the refrigerator, the width of the track being not materially greater than twice the diameter of a container, the track being disposed depthwise of the refrigerator, said rail parts being a relatively small distance above the bottom contact surface and constituting the only retaining means for the containers, whereby a container may be pushed at the front of the refrigerator to cause all the containers to travel in the track, guided by the rail parts, the containers on one side of the track moving rearwardly and on the other forwardly, the containers acting as rollers with respect to each other.

5. In a refrigerator, walls defining a food space having a given depth, a horizontal shelf in said food space, a substantially endless track associated with said shelf having lateral rail parts and bottom contact surface of small area, and a plurality of cylindrical containers on said track, the length of the track being substantially equal to the depth of the refrigerator, the width of the track being not materially greater than twice the diameter of a container, the track being disposed depthwise of the refrigerator, said rail parts being a relatively small distance above the bottom contact surface and constituting the only retaining means for the containers, and the track being inclined downwardly toward the front of the shelf, whereby a container may be pushed at the front of the refrigerator to cause all the containers to travel in the track, guided by the rail parts, the containers on one side of the track moving rearwardly and on the other forwardly, the containers acting as rollers with respect to each other.

6. In a refrigerator, walls defining a food space having a given depth, a horizontal shelf in said food space, a separate substantially endless track having lateral rail parts and bottom contact surface of small area, and a plurality of cylindrical containers on said track, means to position the track on the shelf, the length of the track being substantially equal to the depth of the refrigerator, the width of the track being not materially greater than twice the diameter of a container, the track being disposed depthwise of the refrigerator, said rail parts being a relatively small distance above the bottom contact surface and constituting the only retaining means for the containers, whereby a container may be pushed at the front of the refrigerator to cause all the containers to travel in the track, guided by the rail parts, the containers on one side of the track moving rearwardly and on the other forwardly, the containers acting as rollers with respect to each other.

7. For use in a refrigerator, a shelf including a frame member, supporting members attached to said frame member, and a substantially endless track integral with the shelf having relatively straight portions and curved portions and formed of wires, at least some of said wires being attached to said frame member.

8. For use in a refrigerator, a shelf including a frame member, supporting members attached to said frame member, and a substantially endless track integral with the shelf having relatively straight portions and curved portions and formed of wires, at least some of said wires being attached to said frame member, the bottom of the track being set down with respect to the supporting members.

9. For use in a refrigerator, an open substantially endless track having relatively straight portions and curved portions and formed of wire members secured together, some of said wire members constituting lateral guide rails and others providing bottom surface, and a plurality of cylindrical containers adapted to rest in and be pushed around the track.

10. The combination with a plurality of containers adapted to store different kinds of food, of a supporting and guiding structure therefor having bottom supporting surface and guide parts and forming a substantially endless track, the guide parts directing the containers near the bottom, said structure being formed to permit circulation of air in contact with the containers and said track having relatively straight portions and curved portions, said structure permitting the containers to be pushed by hand around the track.

11. Apparatus as set forth in claim 10 in which the containers are cylindrical and of given outside diameter and the width of the track structure is not materially greater than twice the outside diameter of a container.

12. Apparatus as set forth in claim 10 in which the guide parts are somewhat above the bottoms of the containers.

13. Apparatus as set forth in claim 10 including structure for securing the track structure to the shelf of a refrigerator.

14. Apparatus as set forth in claim 10 in which the track structure is a permanent part of a refrigerator shelf.

15. Apparatus as set forth in claim 10 constructed to permit the containers to be pushed around the track in either direction.

16. The combination with a plurality of containers adapted to store different kinds of food, of a supporting and guiding structure therefor having bottom supporting surface and guide parts and forming a substantially endless track, the guide parts directing the containers near the bottom and constituting the only guiding means for the containers, said structure being formed to permit circulation of air in contact with the containers, said structure permitting the containers to be pushed by hand around the track.

17. For use in a refrigerator, a substantially endless track having straight portions and curved portions and formed of metal sheet material, part of the material forming lateral guide rails and part of the material forming bottom surface, and a plurality of containers adapted to rest upon and be pushed around the track, the sheet material being formed to permit circulation of air in contact with the containers.

18. For use in a refrigerator, a substantially endless track of greater extent in one direction than in another, a plurality of containers adapted to rest upon and be pushed around said track, said track being formed to permit circulation of air in contact with said containers, and means for positioning said track on the shelf of a refrigerator.

ROBERT LAY HALLOCK.